US008204213B2

(12) United States Patent
Hunt et al.

(10) Patent No.: US 8,204,213 B2
(45) Date of Patent: Jun. 19, 2012

(54) SYSTEM AND METHOD FOR PERFORMING A SIMILARITY MEASURE OF ANONYMIZED DATA

(75) Inventors: Brand Lee Hunt, Las Vegas, NV (US); Jeffrey James Jonas, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 1242 days.

(21) Appl. No.: 11/394,271

(22) Filed: Mar. 29, 2006

(65) Prior Publication Data

US 2007/0239705 A1   Oct. 11, 2007

(51) Int. Cl.
*H04L 9/28* (2006.01)
*G06F 12/14* (2006.01)
*G06F 7/04* (2006.01)

(52) U.S. Cl. ........... 380/28; 707/698; 713/189; 713/190
(58) Field of Classification Search .................. None
See application file for complete search history.

(56) References Cited

U.S. PATENT DOCUMENTS

| | | | | |
|---|---|---|---|---|
| 5,384,849 | A * | 1/1995 | Jeong | 348/425.2 |
| 6,137,911 | A * | 10/2000 | Zhilyaev | 382/225 |
| 6,240,409 | B1 * | 5/2001 | Aiken | 707/4 |
| 6,397,224 | B1 | 5/2002 | Zubeldia et al. | |
| 6,788,779 | B2 | 9/2004 | Ostapchuck | |
| 6,801,915 | B1 | 10/2004 | Mack | |
| 7,046,802 | B2 * | 5/2006 | Rogaway | 380/37 |
| 7,584,204 | B2 * | 9/2009 | Kapoor et al. | 1/1 |
| 7,599,930 | B1 * | 10/2009 | Burns et al. | 707/6 |
| 2002/0091678 | A1 | 7/2002 | Miller et al. | |
| 2004/0002816 | A1 | 1/2004 | Milosavljevic | |
| 2004/0143724 | A1 * | 7/2004 | Jacob et al. | 712/11 |
| 2004/0236720 | A1 | 11/2004 | Basso et al. | |
| 2004/0261016 | A1 * | 12/2004 | Glass et al. | 715/512 |
| 2005/0097318 | A1 | 5/2005 | Bolosky et al. | |
| 2005/0165852 | A1 | 7/2005 | Albornoz et al. | |
| 2005/0182777 | A1 | 8/2005 | Block et al. | |
| 2009/0006855 | A1 * | 1/2009 | Tuyls et al. | 713/182 |

FOREIGN PATENT DOCUMENTS

| | | |
|---|---|---|
| JP | 4185188 A | 10/1992 |
| JP | 02/334114 A | 11/2002 |
| WO | WO99/40702 A1 | 8/1999 |

* cited by examiner

*Primary Examiner* — Nasser Goodarz
*Assistant Examiner* — Fatoumata Traore
(74) *Attorney, Agent, or Firm* — Gates & Cooper LLP

(57) ABSTRACT

A similarity measure system selects a first value and a first context related to the first value, divides the first value into a first set of substrings in an order preserving way, and processes each of these substrings through an obfuscation function to produce a first set of obfuscated substrings. The system selects a second value and a second context related to the second value, and processes the second value to produce a second set of obfuscated substrings. The system calculates a context similarity measure for the first context and the second context. The system determines a value similarity measure from the first and second set of order preserved obfuscated substrings. The system determines a closeness degree between the first value and the second value and a closeness degree based on the context similarity measure.

31 Claims, 5 Drawing Sheets

SYSTEM AND METHOD FOR PERFORMING A SIMILARITY MEASURE OF ANONYMIZED DATA

FIELD OF THE INVENTION

This invention relates to the field of comparing values in a privacy-preserving manner.

BACKGROUND OF THE INVENTION

Various parties (e.g., corporations, governmental agencies and natural persons) face a common dilemma: how can parties share specific information (e.g., health care data, customer prospect lists, a terrorist watch list, black list or a list of actual or potential problematic entities) that can assist the parties via business optimization, improved analysis, or detecting the presence of potential terrorists or other problematic parties, while maintaining the security and confidentiality of such information.

Hesitation to contribute or otherwise disclose, as well as laws governing the use and disclosure of, certain information is predicated upon a concern that the information may be subjected to unintended disclosure or used in a manner that may violate privacy policies or otherwise cause damage to the party. Such damage may include identity theft, unauthorized direct marketing activities, unauthorized or intrusive governmental activities, protected class (e.g., racial, religious, gender, ethnic) profiling and discrimination, anti-competitive practices, defamation, credit damage, or economic damage.

Conventional systems use various means to transfer data in a relatively confidential manner within or between parties. Although this technology has proven to be useful, it would be desirable to present additional improvements. For example, some conventional systems use a reversible encryption method, which modifies the data to engender some level of confidentiality. The encrypted data is transmitted to a recipient, who uses a comparable decryption method to return the encrypted data to its original format. However, once the data is decrypted, such data is subject to potential loss or use in an unapproved or illegal manner that may cause the very damage that the encryption process was intended to prevent.

Other conventional systems use irreversible cryptographic algorithms, or one-way functions, such as MD-5 (also referred to as message digest 5), to obfuscate sensitive or confidential data. Existing irreversible cryptographic algorithms cause data to be undecipherable and irreversible to protect the confidentiality and security of the data. The irreversible one-way function, when applied to data, results in an identical unique value for the same data regardless of the data source. Therefore, irreversible cryptographic algorithms are often used as a document signature, to make unauthorized document alteration detectable when the document is being shared across parties. For example, suppose a phone number in an original document is altered (for example, by changing the formatting), and irreversibly encrypted. If the original, unaltered data is also irreversibly encrypted, the two encrypted values are different, indicating that one of the electronic documents has been altered.

However, conventional approaches are merely able to determine that information in an irreversibly encrypted format either is an exact match with other irreversibly encrypted information, or is not an exact match with other irreversibly encrypted information. For example, if two numbers, 1000 and 1001 are irreversibly encrypted, conventional approaches can determine that the two encrypted numbers are not an exact match. Conventional approaches are unable to determine, from the encrypted numbers, that a majority of digits of the two original numbers match. In general, when obfuscating numbers through one-way hashing functions such as, for example, MD5, SHA-1 (Secure Hash Algorithm 1), SHA-245 (Secure Hash Algorithm 245), etc., the ability to perform any similarity measures on the hashed number set is removed.

Therefore, there is a need for a method to compare irreversibly encrypted values to determine whether one encrypted value is similar to another encrypted value and determine a measure of similarity between the original values, i.e., "fuzzy" matching. There are no known solutions for "fuzzy" matching in the on-way hashed, encrypted or otherwise anonymized data space. Thus, the need for such a solution has heretofore remained unsatisfied.

SUMMARY OF THE INVENTION

The present invention satisfies this need, and presents a system, a service, a computer program product, and an associated method (collectively referred to herein as "the system" or "the present system") for performing a similarity measure of data after said data has been obfuscated, i.e., hashed, encrypted, or anonymized.

The present system selects a first value and a first context related to the first value, divides the first value into a first set of substrings in an order preserving way, and processes each substring of the first set of substrings through an obfuscation function to produce a first set of obfuscated substrings. The present system selects a second value and a second context related to the second value, divides the second value into a second set of substrings in the order preserving way, and processes each substring of the second set of substrings through the obfuscation function to produce a second set of obfuscated substrings.

The present system receives the first context related to the first value, receives the second context related to the second value, compares the first context with the second context, and calculates a context similarity measure for the first context and the second context based on the comparing. The present system receives the first set of obfuscated substrings, receives the second set of obfuscated substrings, compares the first and second set of obfuscated substrings while observing the preserved order, and determines a similarity measure for the first and second values based on the comparing. The present system determines a closeness degree between the first value and the second value based on the similarity measure and the context similarity measure. It should be clear that the order of operation enumerated herein is not exclusive and does not limit the present invention to the exemplary order recited herein.

The present system may be embodied in a utility program such as a similarity measure utility program. The present system further provides a method for the user to create, as an input data source, anonymized data for analysis by the similarity measure utility. The similarity measure utility provides a method for the user to specify performance parameters and then invoke the similarity measure utility to determine a closeness degree between a first value and a second value selected from the input data sources. The performance parameters comprise a similarity threshold for determining whether the first value and the second value are similar. The performance parameters further comprise one or more attribute thresholds for one or more attributes of a first context associated with the first value and a second context associated with the second value. The attribute thresholds determine whether the first context and the second context are similar.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
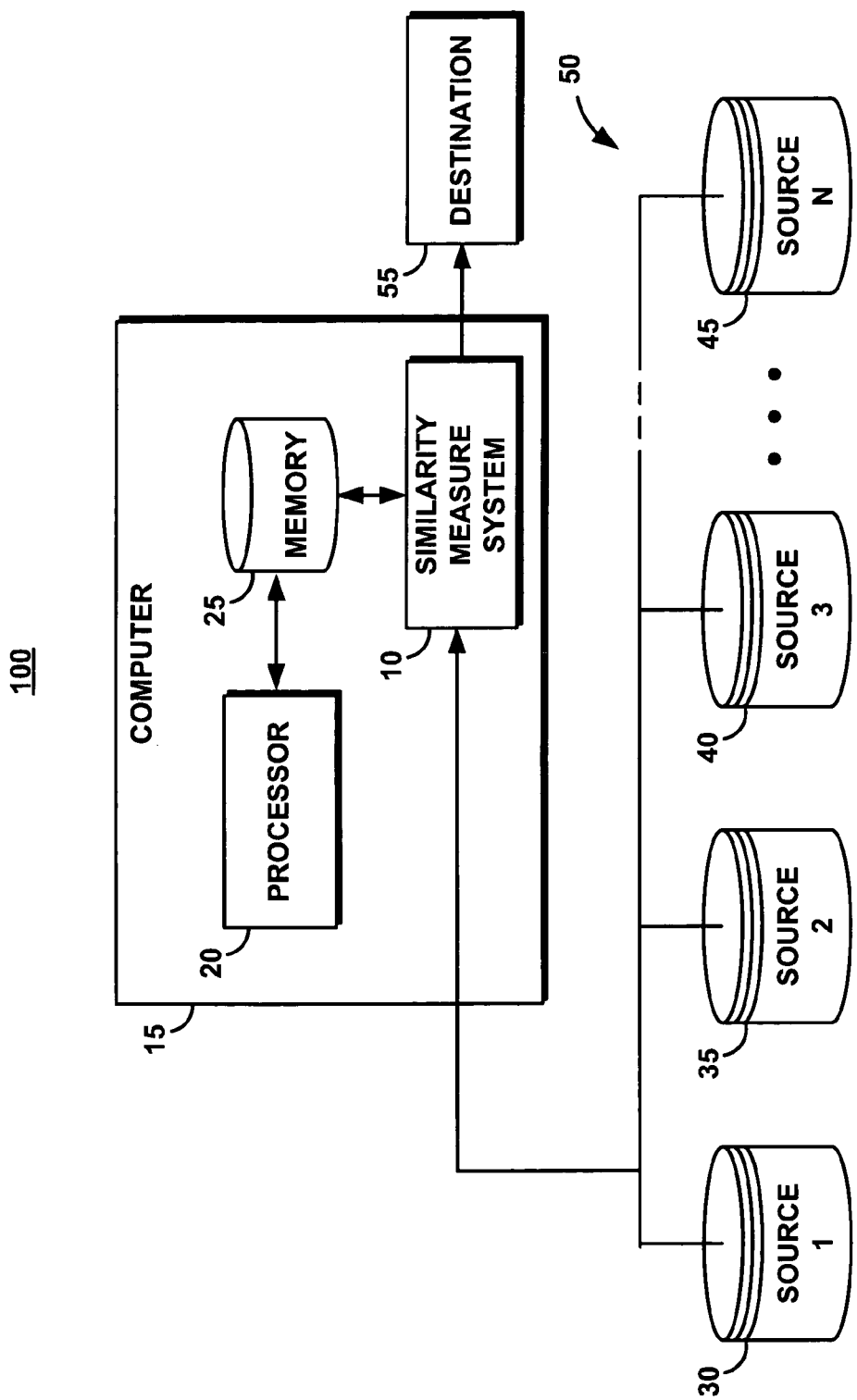
FIG. 1 is a schematic illustration of an exemplary operating environment in which a similarity measure system of the present invention can be used.

FIG. 1 portrays an exemplary overall environment (a computer processing system 100) in which a system, a service, a computer program product, and an associated method (the similarity measure system 10 or "system 10") for performing a similarity measure in an anonymized space according to the present invention may be used. System 10 comprises a software programming code or a computer program product that may be embedded, for example, within, or installed on a computer 15. All or part of system 10 may be embodied within various applications and equipment, depending upon confidentiality and security requirements. For example, system 10 embodied on a computer readable medium may be in a software application on the computer processing system 100, in a memory unit that self-destructs upon any tampering, or in a removable memory such as a CD, DVD or floppy disc. It should be clear that system 10 may operate, at least in part, at the data source elements 30, 35, 40, 45, and is not limited to computer 15, as shown in FIG. 1, which is presented herein for illustration purpose only.

The present invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems (e.g., data sources contributing obfuscated data) or remote printers or storage devices through intervening private or public networks. Modems, cable modem and Ethernet cards are just a few of the currently available types of network adapters.

The computer processing system 100 comprises at least one computer 15 having a processor 20 and computer readable memory 25. System 10 is stored in the memory 25 and is executed by the processor 20. System 10 receives anonymized data records with context from one or more data sources such as source 1, 30, data source 2, 35, data source 3, 40, through data source N, 45, collectively referenced as privacy-protected data sources 50. The privacy-protected data sources 50 store anonymized data values and contexts associated with those anonymized data values. System 10 stores received values and context and can compare any received values with themselves or newly received values with previously received values to generate a similarity result of data values.

System 10 can send the generated similarity result to a destination 55. In one embodiment, system 10 encrypts the similarity result and sends the encrypted similarity result to the destination 55. The destination 55 can be, for example, an application, a wireless device, a queue, an end-user, a communication device, a computer, a handheld appliance, a mobile device, a telephone, a pager, a file system, a database, or an audit log. Queues may be used, for example, as a destination for generated similarity measures to stage results in a first-in-first-out (FIFO) or last-in-last-out (LIFO) order while awaiting a request from another process. Each generated similarity measure may be posted to memory, for example, a persistent data store, an audit log, etc., using any form of media including hard disk, WORM drive, paper tap, etc.) so as to accurately record the outcomes. It is also possible that the similarity result is not published to a destination, rather stored in the memory for future recall.

System 10 evaluates similarity between values in a privacy-preserving manner, enabling a comparison of values while the values are managed, stored, and evaluated in an obfuscated form (encrypted, one-way hashed, or other anonymization function, etc.). If the similarity result indicates that obfuscated information of one value is the same or similar to another obfuscated value, the consequence of this activity enables systems to perform more advanced analytic functions while enhancing privacy protections. For example, if names and addresses are the same while the United States Social Security Numbers are different, in the obfuscated data space these may be likely evaluated as two discreet identities, for example a junior and senior of the same household. Using this process, system 10 can determine in the obfuscated data space that the United States Social Security Numbers are inconsistent by a minimal number of digits, providing evidence to suggest that the two identities are in fact the same.

Figure 2:
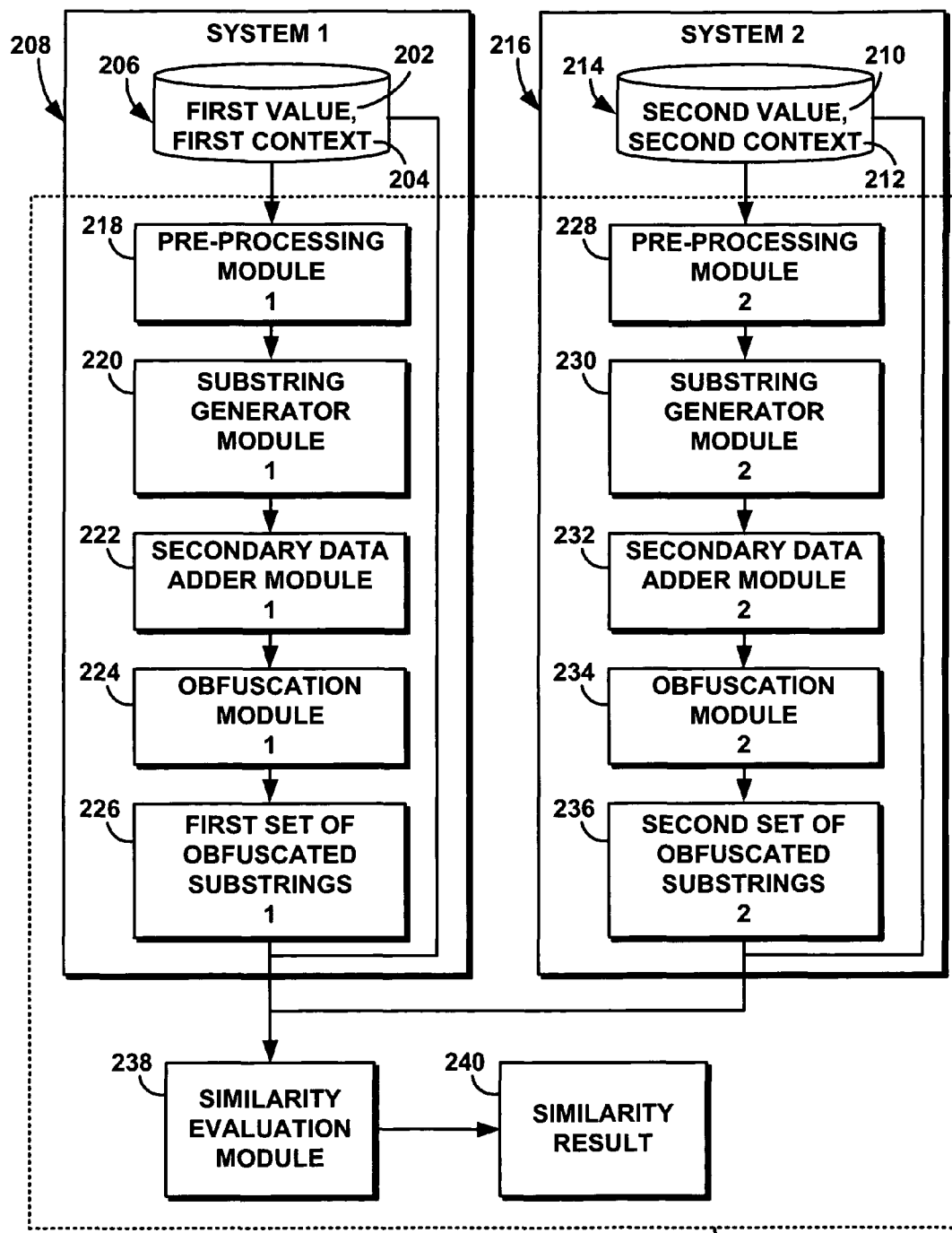
FIG. 2 is a block diagram of the exemplary similarity measure system of FIG. 1.

FIG. 2 illustrates a high-level hierarchy of system 10. System 10 performs a privacy-enhancing similarity measure process to determine whether one value, such as a first value 202 with a first context 204 in a database 1, 206, of a system 1, 208, matches another value such as a second value 210 with a second context 212 in a database 2, 214, in a system 2, 216. Though elements 218, 220, 222, 224, 226, 228, 230, 232, 234, and 236 of systems 1 and 2 are shown herein as forming part of system 10 for illustration purpose, only, it should be clear that these elements may, in a preferred embodiment, be implemented as part of sources 30, 35, 40, 45.

The first context 204 provides a context for the first value 202 and the second context 212 provides a context for the second value 210. The first context 204 and the second context 212 each comprise one or more attributes such as, for example, date, time, location, type, and class. The attributes may be a single value or a range of values. Similarity evaluation module 238 uses the first context 204 and second context 212 to determine a context similarity measure indicating validity of a comparison between the first value 202 and the second value 210. For example, the first value 202 may be a phone number and the first context 204 may be a date represented as a range of years 1970 to 1980. The second value 210 may be a phone number and the second context 212 may be a date represented as a range of years 2002 to 2004. Similarity evaluation module 238 may find the first value 202 and the second value 210 to be similar, but comparison of the first context 204 and the second context 212 indicates a lower closeness degree because the first context 204 and the second context 212 are not close (e.g., not same, near, overlapping, etc.).

In one embodiment, the first value 202 is pre-processed by a pre-processing module 1, 218. Examples of pre-processing functions performed by the pre-processing module 1, 218 are discussed below with reference to FIG. 3. The first value 1, 202, passes through a substring generator module 1, 220, which produces a first set of substrings in an order preserving way. An example of producing substrings is shown in FIG. 4, which is discussed below. In another embodiment, a secondary data adder module 1, 222, adds secondary data to each substring in the first set of substrings to preserve the order of the substrings. Examples of secondary data are discussed below with reference to FIG. 4. An obfuscation module 1, 224, applies an obfuscation function to each of the substrings in the first set of substrings in an order preserving way to produce a first set of obfuscated substrings 1, 226.

Similarly, in one embodiment, the second value 210 is pre-processed by a pre-processing module 2, 228. The second value 210 passes through a substring generator module 2, 230, which produces a second set of substrings. In another embodiment, a secondary data adder module 2, 232, adds secondary data to each substring in the second set of substrings to preserve the order of the substrings. An obfuscation module 2, 234, applies an obfuscation function to each of the substrings in the second set of substrings in an order preserving way to produce a second set of obfuscated substrings 2, 236. The first set of obfuscated substrings 1, 226, the first context 204, the second set of obfuscated substrings 2, 236, and the second context 212 are input to a similarity evaluation module 238. The similarity evaluation module 238 compares the first context 204 and the second context 212 to determine a context similarity measure that quantifies a similarity between the first context 204 and the second context 212 based on the comparison. The similarity evaluation module 238 further compares the first set of order preserved obfuscated substrings 1, 226 and the second set of order preserved obfuscated substrings 2, 236, to determine a similarity measure in a privacy-protected manner that quantifies a similarity between the first value 202 and the second value 210 based on the comparison.

The similarity evaluation module 238 determines a closeness degree between the first value 202 and the second value 212. The closeness degree is determined from the context similarity measure and the value similarity measure. The similarity result 240 comprises the closeness degree. In one embodiment, the similarity result 240 comprises the closeness degree (e.g., 92%) and could also include the value similarity measure, and the context similarity measure. The similarity result 240 can indicate that the first value 202 and the second value 210 are identical. The similarity result 240 can also indicate a degree of similarity (i.e., the closeness degree) of the first value 202 and the second value 210, expressed, for example, as a percentage. Based on the percentage, the similarity result 240 can indicate that the first value 202 and the second value 210 are same, similar, or that the first value 202 and the second value 210 are not similar.

Figure 3A:
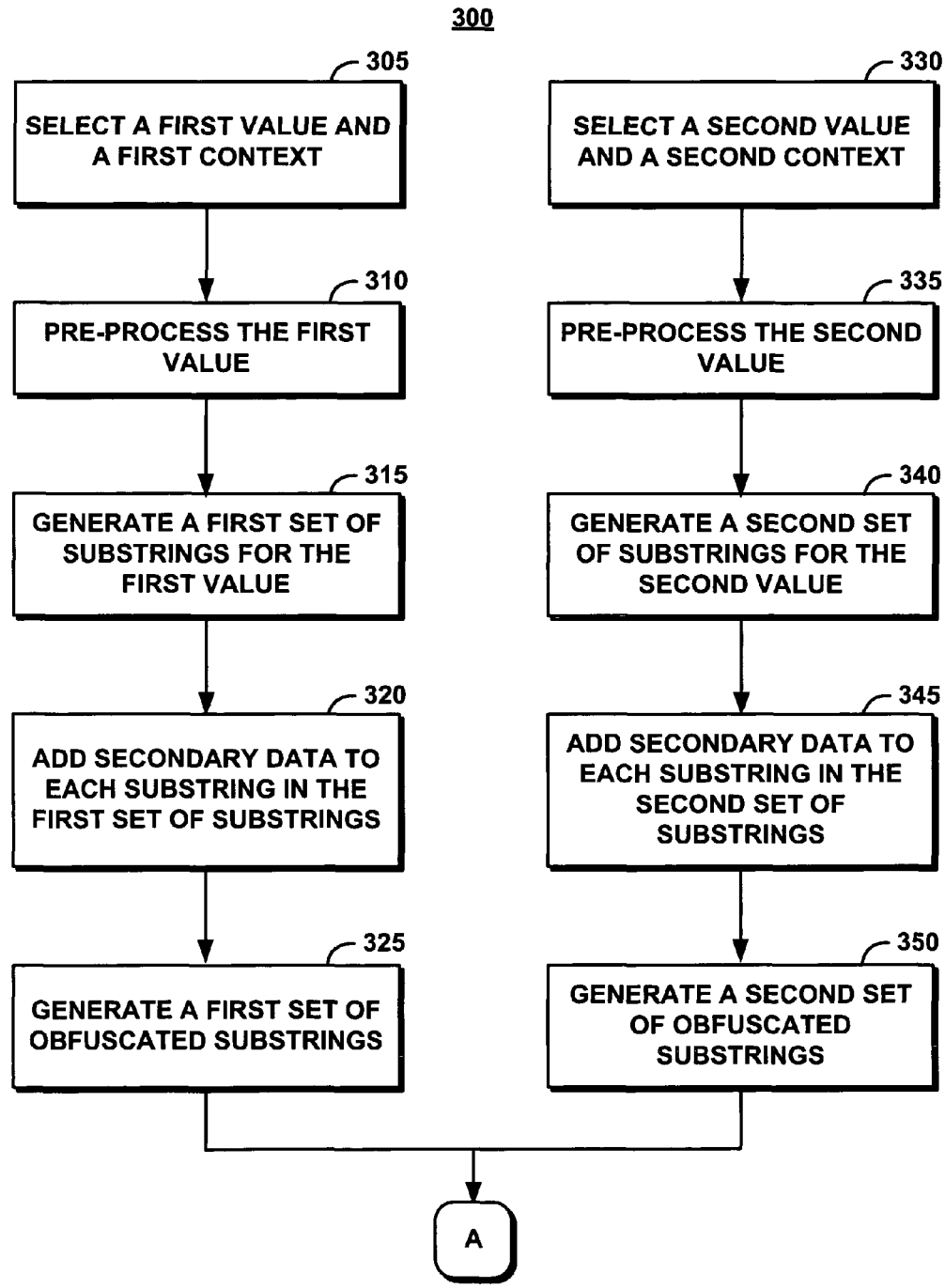
FIG. 3 comprises FIGS. 3A and 3B and represents a process flow chart illustrating a method of operation of the similarity measure system of FIGS. 1 and 2.
Figure 3B:
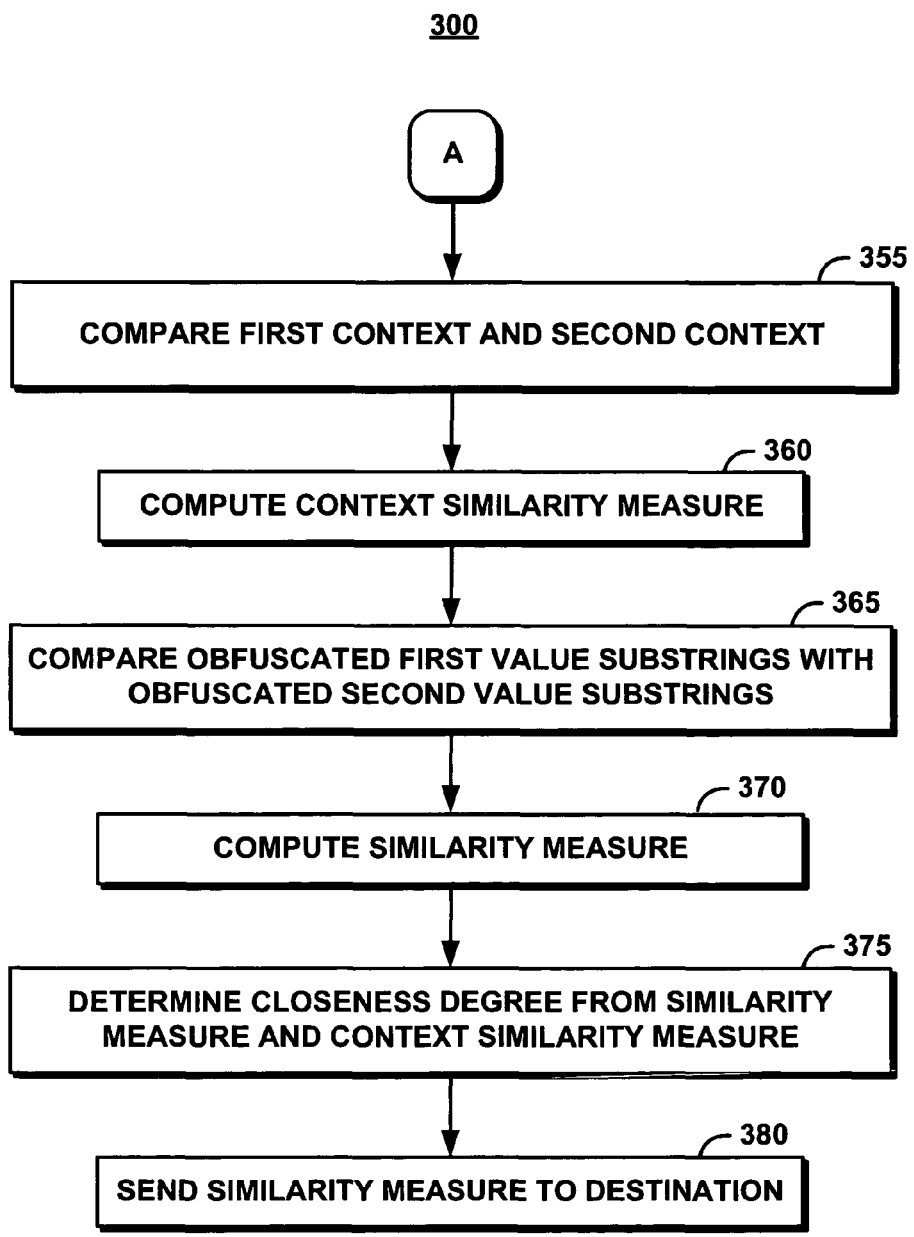
Figure 4:
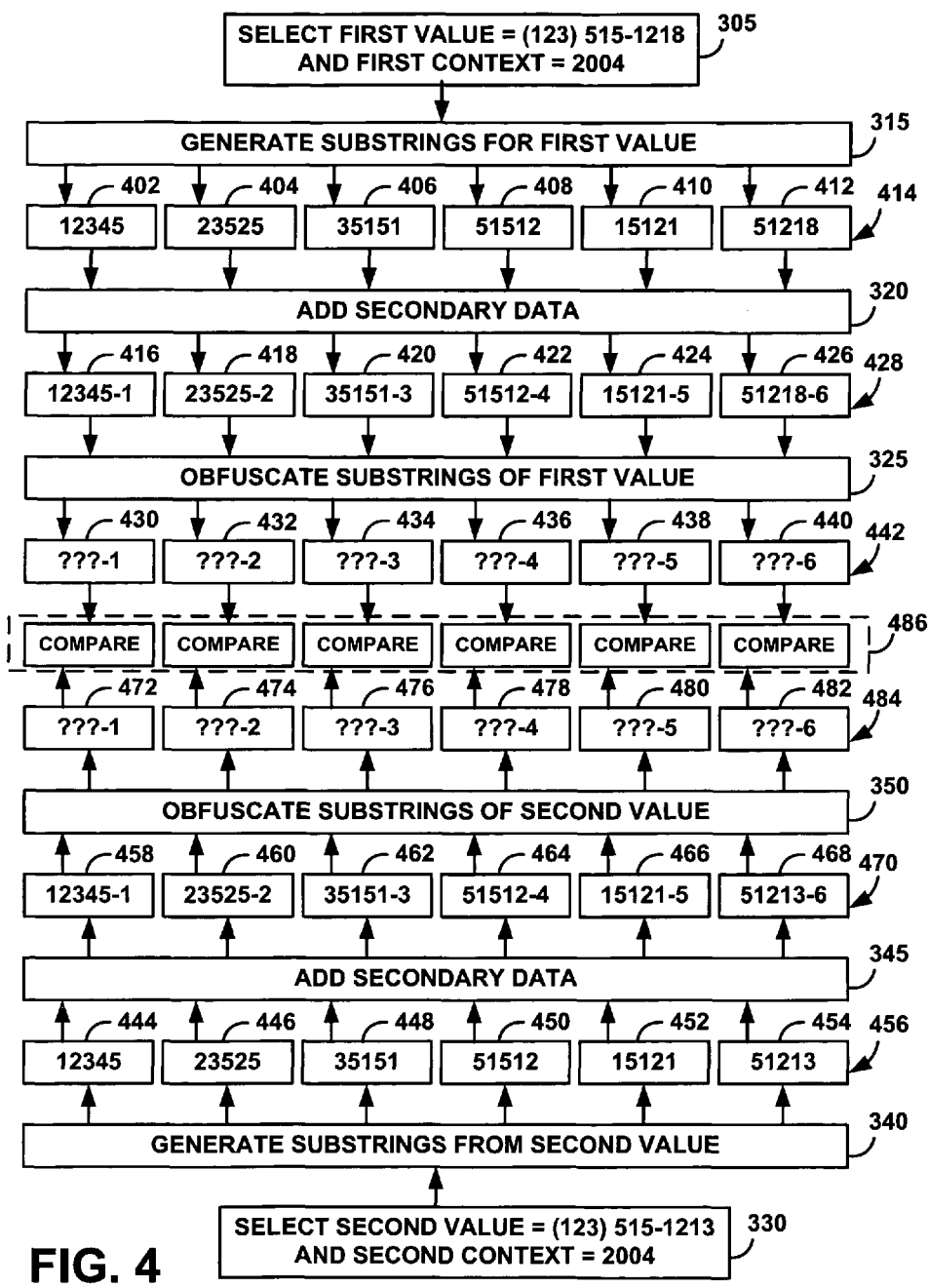
FIG. 4 is a diagram illustrating performance of the similarity measure system of FIGS. 1 and 2 for an exemplary first value, a first context, a second value, and a second context.

FIG. 3 illustrates a method 300 of system 10 in performing a similarity measure. Data source 1, 30 selects a first value 202 and a first context 204 related to the first value 202 (step 305). In one embodiment, the pre-processing module 1, 218, pre-processes the first value 202 (step 310). For example, if each substring in the first set of substrings has a length L and the number of individual values in the first value 202 is not a multiple of the length L, then the first value 202 may be pre-processed by padding the first value 202 with 0's until the length of the first value 202 is a multiple of L. The substring generator module 1, 220, generates a first set of substrings for the first value 202 in an order preserving way by dividing the first value 202 into a set of substrings (step 315). For example, using a length L that is less than the length of the first value 202, the substring generator module 2, 230, generates multiple subsets Y1, Y2, . . . , YN, each of length L, from the first value 202. The secondary data adder module 1, 222, adds secondary data to the first set of substrings (step 320), generating a first set of modified substrings. The secondary data may, among other things, be used to preserve the order of the substrings. The obfuscation module 1, 224, generates the first set of obfuscated substrings 1, 226, from the first set of modified substrings, preserving the order of the substrings (step 325).

The same data source 1 or another data source 2, selects a second value 210 and a second context 212 related to the second value 210 (step 330). In one embodiment, the pre-processing module 2, 228, pre-processes the second value 210 (step 335). The substring generator module 2, 230, generates a second set of substrings for the second value 210 in an order preserving way by dividing the second value 210 into a set of substrings (step 340). Using the length L, the substring generator module 2, 230, generates subsets Z1, Z2, . . . , ZM, each of length L, from the second value 210. In another embodiment, the secondary data adder module 2, 232, adds secondary data to the substrings for second value 210 to among other things preserve the order of the substrings (step 345), generating a second set of modified substrings. The obfuscation module 2, 234, generates the second set of order preserved obfuscated substrings 2, 236, from the second set of modified substrings (step 350).

In one embodiment, the obfuscation is performed by a cryptographic function. Examples of a cryptographic function comprise an encryption function for which a key exists that can decrypt the obfuscated value, a pre-image resistant function, or one-way function that is designed to prevent mathematic reversal of the obfuscated data into its original form.

The similarity evaluation module 238 compares the first context 204 and the second context 212 (step 355) and computes a context similarity measure based on the comparison of step 355 (step 360). The context similarity measure quantifies a similarity between the first context 204 and the second context 212. The first context 204 and the second context 212 comprise attributes such as, for example, date, time, location, type, and class. One or more attribute thresholds are associated with each. When a context similarity measure for an attribute is outside the bounds of a similarity threshold, such as above, below, not near, not overlapping the corresponding attribute threshold, the first context 204 and the second context 212 are identified as not similar in context.

The similarity evaluation module 238 compares the set of order preserved obfuscated substrings 1, 226, generated for the first value 202 with the set of order preserved obfuscated substrings 2, 236, generated for the second value 210 (step 365). The similarity evaluation module 238 computes a value similarity measure based on the comparison of step 365 (step 370). The similarity evaluation module 238 determines a closeness degree for the first value 202 and the second value 210 from the context similarity measure and the value similarity measure (step 375). The similarity result 240 comprises the closeness degree. System 10 sends the similarity result 240 to destination 55 (step 380) which may include a persistent data store, an audit log, a system, a queue, or a user.

For example, when all obfuscated substrings in the first set of obfuscated substrings 1, 226, match all of the obfuscated substrings in the second set of obfuscated substrings 2, 236, and the first context 204 matches the second context 212, the first value 202 and the second value 210 are an exact match. When some of the obfuscated substrings match or the first context 204 and the first context 212 are similar, the first value 202 and the second value 210 are a close match. When none or a low number of the substrings match (user configurable) or the first context 204 and the second context 212 are not close, the first value 202 and the second value 210 do not match. Thus, the closeness degree is a function of the matching substrings when comparing the first set of obfuscated substrings 2, 226 and the second set of obfuscated substrings 2, 236. Moreover, the closeness degree can be a function of the contextual attributes when comparing the first context 204 with the second context 212. When the context closeness degree is outside of the bound of a similarity threshold, such as above or below the similarity threshold, the first value 202 and the second value 210 are considered non-close values. In an exemplary preferred embodiment, two values are returned: a value similarity and a context similarity, although a single score might alternatively be returned.

The first value and the second value may occur at different points in time. Therefore, the first value and the first context related to the first value will be received and stored. At a later time, when another transaction is received, the second value and the second context related to the second value will be received and compared independently of time.

FIG. 4 illustrates, with further reference to the process flowchart of FIG. 3, an example of determining a closeness degree of two phone numbers in a privacy-preserving manner. As shown in step 305, a first phone number, (123) 515-1218, is selected as the first value 202 with 2004 as the first context 204. In this case, the first context 204 comprises a date attribute. As shown in step 330, the second phone number, (123) 515-1213, is selected as the second value 210 with 2004 as the second context 212. In this case, the second context 212 comprises a date attribute. The first context 204 is identical to the second context 212. The first phone number, (123) 515-1218, is almost identical to the second phone number, (123) 515-1213. The only difference between the two phone numbers is the last digit of each. It should be clear that the first and second values are not necessarily processed at the same time. In addition, in FIG. 4, elements 442 and 484 the order preserving value is presented outside of the anonymized value. In an alternative embodiment, it would be possible to also obfuscate the order preserving value.

If the entire first value 202 ((123) 515-1218) is obfuscated by hashing with a one-way cryptographic function and the entire second value 210 ((123) 515-1213) is obfuscated by hashing with the same one-way function, the result is two hashed values that are unrelated. Therefore, the slight difference between the first value 202 and the second value 210 is lost by the hashing process. To compare the two phone numbers of the first value 202 and the second value 210 to determine a closeness degree in a privacy-enhancing manner, the phone numbers are divided into substrings of digits in an order preserving way. Data source 1-N separately obfuscates, in a privacy-preserving manner, the substrings of digits so that the similarity evaluation module can compare corresponding substrings and calculate a similarity measure based on the results of the comparison.

The first value 202 is divided at step 315 to generate a first set of substrings 402, 404, 406, 408, 410, and 412 (collectively referenced as the first set of substrings 414), where each subset has a length L of five digits. In one embodiment, a pre-processing function is performed to the first value 202 before the first value 202 is divided into substrings. Examples of a pre-processing function include a standardization function, a standard reformatting function, a truncation function, a padding function, a byte alteration function, or a transliteration function. Standardization or reformatting function may transform 800.555.1212 and 800/555-1212 into the 8005551212 format. A truncation function may drop trailing spaces from a value. For example, "06/12/1963 " may be changed to be "06/12/1963". A padding function may insert leading zeros in a value for example "80213" may become "00080213". A byte alteration function may redact one or more bytes, for example "12/31/2006" may become simply "12/31/2006". A transliteration function may translate a Chinese calendar date to a Julian calendar date.

In one embodiment, secondary data is conjoined with the first set of substrings before the first set of substrings 414 is obfuscated. In another embodiment, the secondary data is added as a tag to the first set of substrings after obfuscation. Examples of pre-conjoined secondary data may comprise what is commonly referred to as SALT. SALT refers to additional data of some substantial length (e.g., 1024 bytes) that is conjoined with each substring before the obfuscation function is performed. The SALT value is protected as a secret. The use of SALT protects the obfuscated database from being revealed through what is commonly referred to as a "dictionary attack". It should be noted that SALT is added before obfuscation.

Another example of secondary data may entail the use of a sequence number. A sequence number can be conjoined with each substring before the obfuscation function is performed to preserve the order of the substrings (associated after obfuscation, e.g., appended). A sequence number (e.g., part 1, part 2, part 3, etc) can be used to ensure that the similarity function evaluates each part of the substrings in their natural order (i.e., order preserved). For example, a three byte value used to make three substrings (e.g., "XYZ"="X", "Y", and "Z") may when compared for similarity to "ZYX" or as substrings "Z", "Y", "X" appear to be similar in every part i.e., 100% similar. Using sequence numbers, "XYZ" becomes "1-X", "2-Y", and "3-Z" and ZYX becomes "1-Z", "2-Y", and "3-X". Once the substrings are obfuscated with conjoined sequence numbers, no substring from "XYZ" matches any substring from "ZYX," thus the similarity score is 0%. SALT, sequence number, and tertiary values can be used collectively on substrings before obfuscation is performed.

Returning to the example of FIG. 4, secondary data is added to each substring in the first set of substrings 414 to produce modified substrings 416, 418, 420, 422, 424, and 426 (collectively referenced as the first set of modified substrings 428) (step 320). In the example of FIG. 4, the secondary data that is added to each substring in the first set of substrings 414 is a sequence identifier that is used to preserve the order of the substrings in the first set of substrings. Each substring of the first set of modified substrings 428 (with the inclusion or exclusion of the secondary data) is obfuscated by individually hashing at step 325 by a cryptographic one-way function to produce obfuscated substrings 430, 432, 434, 436, 438, and 440 (collectively referenced as the first set of obfuscated substrings 442). In one embodiment, the secondary data is added to the first set of substrings at step 325 after obfuscation. For example, obfuscated substring 430 contains obfuscated data represented by question marks, and secondary data represented by a "1". The obfuscation at step 325 in this example produces an order preserved first set of obfuscated substrings. In another embodiment, the secondary order preserving value (e.g., a sequence number or other value assigned to designate a position) may be conjoined with the substring before obfuscation, thereby obfuscating both the value and the order.

The second value 210 ((123) 515-1213) is divided at step 340 to generate a second set of substrings 444, 446, 448, 450, 452, and 454 (collectively referenced as the second set of substrings 456). In one embodiment, a pre-processing function is performed to the second value 210 before the second value 210 is divided into substrings. Secondary data is added to the second set of substrings 456 to produce order preserved substrings 458, 460, 462, 464, 466, and 468 (collectively referenced as the second set of modified substrings 470) (step 345). Each substring of the second set of modified substrings 470 is obfuscated at step 350 by individually hashing with the same cryptographic one-way function used in step 325 to produce obfuscated substrings 472, 474, 476, 478, 480, and 482 (collectively referenced as the second set of obfuscated substrings 484). In one embodiment, the secondary data is added before the obfuscation at step 350. All pre-processing and secondary data are consistently applied between the first value and the second value.

As represented by box 484, the similarity evaluation module 238 compares corresponding substrings of the first set of order preserved obfuscated substrings 442 and the second set of order preserved obfuscated substrings 484, to determine the similarity measure of the privacy-protected values. The similarity evaluation module 238 further compares the first context 204 with the second context 212 to determine the context similarity measure. Box 486 represents steps 355 through 370.

Because substring 402 is identical to substring 444 and in the same physical position (first part), the obfuscated substring 430 is identical to the obfuscated substring 472. Similarly, the obfuscated substring 432 and the obfuscated substring 474 are identical; the obfuscated substring 434 and the obfuscated substring 476 are identical; the obfuscated substring 436 and the obfuscated substring 478 are identical; and the obfuscated substring 438 and the obfuscated substring 480 are identical. Because substring 412 is different from substring 454, the obfuscated substring 440 and the obfuscated substring 482 are different. A comparison of the set of obfuscated substrings 442 with the set of obfuscated substrings 484 indicates that five of the six obfuscated substrings match. Therefore, the similarity measure is the amount of matching obfuscated substrings divided by the total amount of obfuscated substrings, 5/6 or 0.83. This similarity measure of 83 percent indicates that at least 83 percent of the two original numbers are the same. (A similarity measure of 1.0 represents identical values, and a similarity measure of 0.0 represents highly dissimilar or otherwise completely different values.) The length L of each of the substrings can be user configured to vary the granularity of the similarity measure.

The similarity evaluation module 238 compares the first context 204 (=2004) with the second context 212 (=2004) and finds an exact match, so the context similarity measure may be presented as 100. If the context where date ranges whereby the ranges overlap, this may produce another score on a 1-100 scale. For example, two five year date ranges each only overlapping in a single month might produce a low value. Furthermore, if the same two five year date ranges did not overlap but were contiguous (e.g., 1/1/1995-12/31/1999 and 1/1/2000-12/31/2004) may yield a lower score—this will depend on the specific application. The similarity evaluation module 238 determines the closeness degree for the first value 202 and the second value 210 from the similarity measure and the context similarity measure. The two values are preferably not combined; rather, each value is reported distinctly.

It is to be understood that the specific embodiments of the invention that have been described are merely illustrative of certain applications of the principle of the present invention. Numerous modifications may be made to the system and method for performing numeric similarity measures in an anonymized space described herein without departing from the spirit and scope of the present invention.

What is claimed is:

1. A processor-implemented method of performing a similarity measure of a plurality of privacy-protected data, comprising:

selecting, in a processor, a first value and a first context related to one or more attributes of the first value;

dividing, in the processor, the first value into a first plurality of substrings in an order preserving way;

processing, in the processor, each substring of the first plurality of substrings through an obfuscation function to produce a first plurality of order preserved obfuscated substrings;

selecting, in the processor, a second value and a second context related to one or more attributes of the second value;

dividing, in the processor, the second value into a second plurality of substrings in the order preserving way;

processing, in the processor, each substring of the second plurality of substrings through the obfuscation function to produce a second plurality of order preserved obfuscated substrings;

comparing, in the processor, the first and second plurality of order preserved obfuscated substrings, and determining a value similarity measure for a comparison of the first and second values based on the comparison of the first and second plurality of order preserved obfuscated substrings;

comparing, in the processor, the first context and the second context, and determining a context similarity measure for the first context and the second context based on the comparison of the first and second contexts, wherein the context similarity measure indicates a validity of the comparison between the first and second values; and determining a closeness degree between the first and second values from the context similarity measure and the value similarity measure.

2. The method of claim 1, further comprising adding a sequence identifier to each of the first plurality of substrings to preserve the order of the first plurality of substrings.

3. The method of claim 2, wherein the sequence identifier includes any one or more of: a sequential number, a position specific assigned value, and a value used to designate an ordered substring.

4. The method of claim 2, further comprising adding a sequence identifier to each of the second plurality of substrings to preserve the order of the second plurality of substrings.

5. The method of claim 4, wherein the sequence identifier includes any one or more of: a sequential number, a position specific assigned value, and a value used to designate an ordered substring.

6. The method of claim 1, further comprising determining whether the first and second values are identical.

7. The method of claim 1, further comprising determining whether the first and second contexts are identical.

8. The method of claim 1, further comprising indicating whether the first and second values are similar based on a percentage of similarity.

9. The method of claim 1, further comprising indicating whether the first and second contexts are similar.

10. The method of claim 1, further comprising indicating whether the first and second values are unrelated based on a percentage of similarity.

11. The method of claim 1, further comprising indicating whether the first and second contexts are unrelated.

12. The method of claim 1, further comprising sending the value similarity result to a destination.

13. The method of claim 12, further comprising encrypting the value similarity result prior to sending the similarity result.

14. The method of claim 12, further comprising encrypting the similarity result prior to sending the similarity result.

15. The method of claim 12, wherein the destination is selected from any one or more of: an application, a queue, an end-user, a communication device, a computer, a handheld appliance, a mobile device, a telephone, a pager, a file system, a database, an audit log and a persistent store.

16. The method of claim 1, further comprising sending the context similarity result to a destination.

17. The method of claim 1, wherein the obfuscation function includes a cryptographic function.

18. The method of claim 17, wherein the cryptographic function occurs on a secure hardware device.

19. The method of claim 1, wherein processing each substring through the obfuscation function occurs on a secure hardware device.

20. The method of claim 1, further comprising:
performing a pre-processing function to the first value before dividing the first value; and
performing the pre-processing function to the second value before dividing the second value.

21. The method of claim 20, wherein the pre-processing function is selected from any one of: a standard reformatting function, a truncation function, a padding function, a byte alteration function, and a transliteration function.

22. The method of claim 1, further comprising:
adding a secondary data to each substring of the first plurality of substrings before processing the first plurality of substrings through the obfuscation function; and
adding the secondary data to each substring of the second plurality of substrings before processing the second plurality of substrings through the obfuscation function.

23. The method of claim 22, wherein the secondary data is selected from any one or more of: a SALT value, an order preserving value, a supplemental value, and a combination of the order preserving value and the supplemental value.

24. The method of claim 1, wherein the first and second value are received, encrypted, and then decrypted for processing.

25. The method of claim 1, wherein the attributes include any one or more of: date, time, location, type, and class.

26. A processor-implemented system for performing a similarity measure of a plurality of privacy-protected data, comprising:
a similarity measure system, performed in a processor, for selecting a first value and a first context related to one or more attributes of the first value;
a substring generator module, performed in the processor, for dividing the first value into a first plurality of substrings in an order preserving way;
an obfuscation module, performed in the processor, for processing each substring of the first plurality of substrings through an obfuscation function to produce a first plurality of order preserved obfuscated substrings;
the similarity measure system selecting a second value and a second context related one or more attributes of to the second value;
the substring generator module dividing the second value into a second plurality of substrings in the order preserving way;
the obfuscation module processing each substring of the second plurality of substrings through the obfuscation function to produce a second plurality of order preserved obfuscated substrings;
a similarity evaluation module, performed in the processor, for comparing the first and second plurality of order preserved obfuscated substrings, and for determining a value similarity measure for a comparison of the first and second values based on the comparison of the first and second plurality of order preserved obfuscated substrings;
the similarity evaluation module comparing the first context and the second context, and determining a context similarity measure for the first context and the second context based on the comparison of the first and second contexts, wherein the context similarity measure indicates a validity of the comparison between the first and second values; and
the similarity evaluation module determining a closeness degree between the first and second values from the context similarity measure and the value similarity measure.

27. The system of claim 26, wherein the substring generator module further adds a sequence identifier to each of the first plurality of substrings to preserve the order of the first plurality of substrings.

28. The system of claim 26, wherein the attributes include any one or more of: date, time, location, type, and class.

29. A computer program product comprising a storage device having program codes stored thereon, wherein the program codes, when read and executed by a processor, result in the processor performing a similarity measure of a plurality of privacy-protected data, the program codes comprising:

a program code for selecting a first value and a first context related to one or more attributes of the first value;

a program code for dividing the first value into a first plurality of substrings in an order preserving way;

a program code for processing each substring of the first plurality of substrings through an obfuscation function to produce a first plurality of order preserved obfuscated substrings;

a program code for selecting a second value and a second context related to one or more attributes of the second value;

a program code for dividing the second value into a second plurality of substrings in the order preserving way;

a program code for processing each substring of the second plurality of substrings through the obfuscation function to produce a second plurality of order preserved obfuscated substrings;

a program code for comparing the first and second plurality of order preserved obfuscated substrings, and determining a value similarity measure for a comparison of the first and second values based on the comparison of the first and second plurality of order preserved obfuscated substrings;

a program code for comparing the first context and the second context, and determining a context similarity measure for the first context and the second context based on the comparison of the first and second contexts, wherein the context similarity measure indicates a validity of the comparison between the first and second values; and a program code for determining a closeness degree between the first and second values from the context similarity measure and the value similarity measure.

30. The computer program product of claim 29, further comprising a program code for adding a sequence identifier to each of the first plurality of substrings to preserve the order of the first plurality of substrings.

31. The computer program product of claim 29, wherein the attributes include any one or more of: date, time, location, type, and class.

* * * * *